Nov. 3, 1970 H. SIBLEY 3,538,272
DETECTOR OF VEHICLE PRESENCE AND PASSAGE
Filed Sept. 10, 1968 2 Sheets-Sheet 1
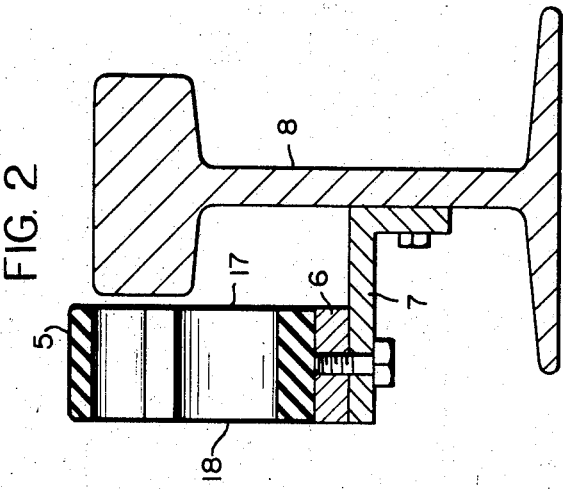
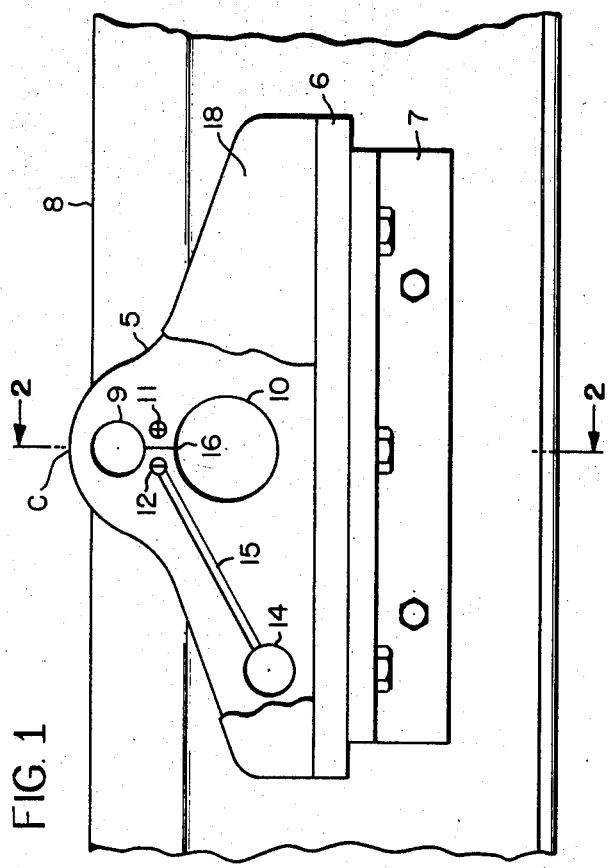
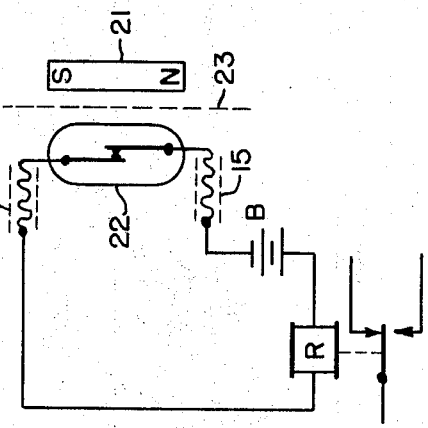
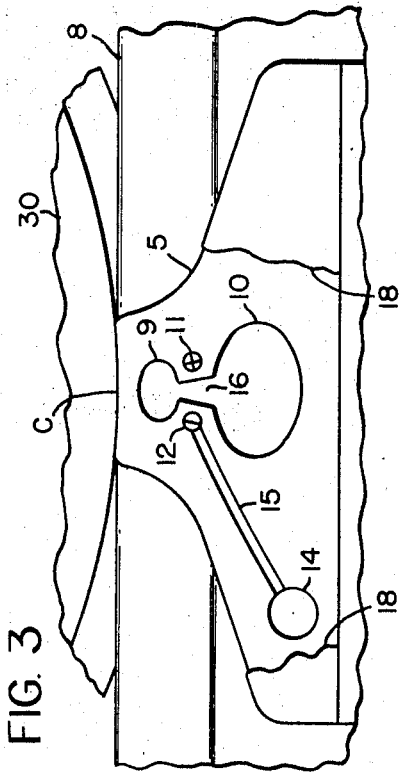
INVENTOR
H. C. SIBLEY
BY Forest B. Hitchcock
HIS ATTORNEY Nov. 3, 1970 H. SIBLEY 3,538,272
DETECTOR OF VEHICLE PRESENCE AND PASSAGE
Filed Sept. 10, 1968 2 Sheets-Sheet 2
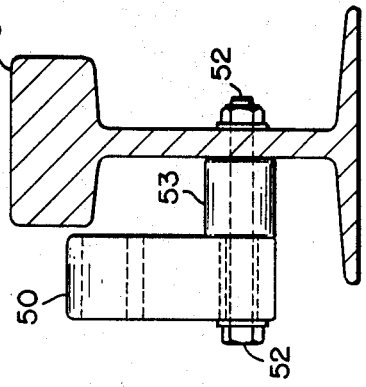
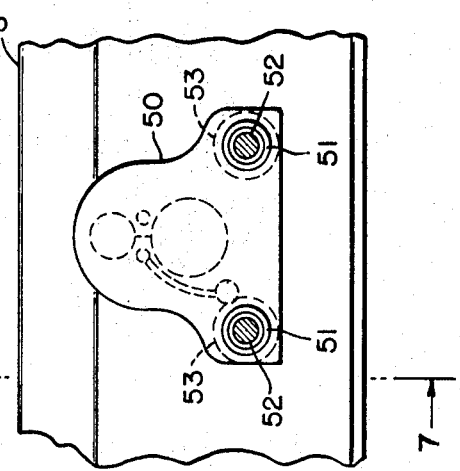
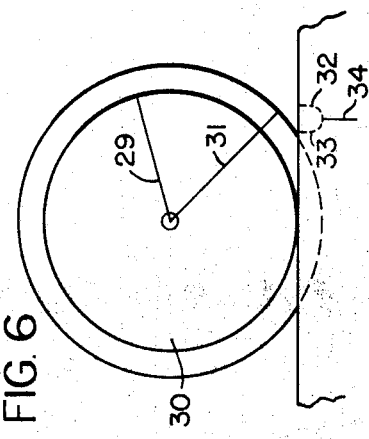
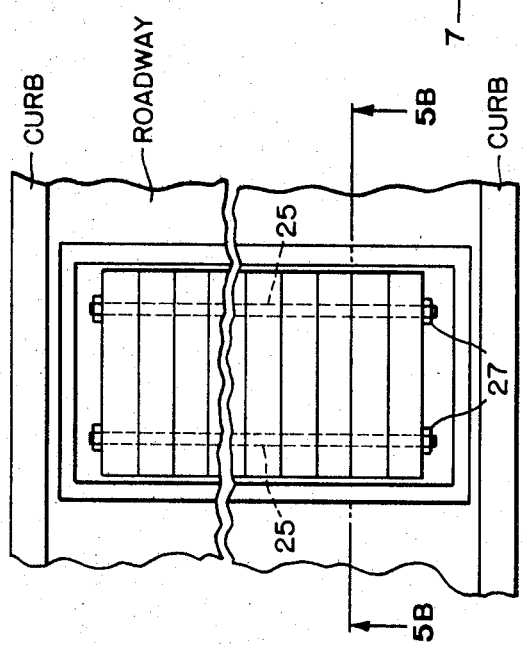
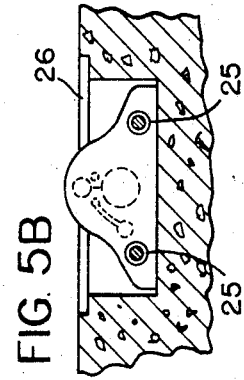
INVENTOR
H.C. SIBLEY
BY *Forest D. Hitchcock*
HIS ATTORNEY

United States Patent Office 3,538,272
Patented Nov. 3, 1970

3,538,272
DETECTOR OF VEHICLE PRESENCE AND PASSAGE
Henry Sibley, Adams Basin, N.Y., assignor to General Signal Corporation, Rochester, N.Y., a corporation of New York
Filed Sept. 10, 1968, Ser. No. 758,765
Int. Cl. H01h 3/16
U.S. Cl. 200—61.41                                   3 Claims

ABSTRACT OF THE DISCLOSURE

This mechanical vehicle detector comprises a rubber block located in the roadway or adjacent a track rail in a positon to be depressed by each passnig wheel. The resilient rubber block has two adqacent cavities, one cavity located above the other cavity, with said two cavities connected by a slit. A reed contact is located in the block on the side of the slit and a permanent magnet is located in the block on the other side of the slit. The permanent magnet causes the reed contacts to be normally operated. The depression of the rubber block by a passing wheel causes the slit to be widened into a substatnial slot so as to provide greater separation between the permanent magnet and the reed contacts which are then released.

BACKGROUND OF INVENTION

This invention relates to a mechanical vehicle detector and, more particularly, pertains to such a device operated repeatedly by the passage of wheels along a roadway or a railroad track to detect the presence and passage of cars.

There is a wide variety of detector units for operating in response to vehicles. Some of these are magnetic inductive type instruments, some are responsive to beams of light, others are responsive to actual mechanical movement. However, most every such detector has its own peculiarities.

For example, the magnetic instrument does not detect the presence of a motionless wheel. The light operated detector is responsive to extraneous sources of light. The mechanical type of track instrument usually involves such a mass of material that it is pounded to pieces by repeated operations. On the other hand, if it is made relatively simple and light weight, it is subject to damage either by malicious mischief or by the accidental movement of dragging equipment.

The present invention proposes to obviate these various objectionable characteristics and at the same time provide both a presence detector and a passage detector. In other words, regardless of whether a wheel is moving or standing still, its presence is detected.

One of the objects of the present invention is to construct detector means of a resilient material which will respond to a large number of operations in quick succession without entering an oscillatory condition.

Another object is to employ a resilient material which will not be damaged by repeated operation.

Another object is to provide the structure in such a way that it is waterproof with regard to the electric portion of the apparatus.

Another object is to provide a self-contained contact operating structure which is operable without direct mechanical contact with its actuating means.

SUMMARY

The present invention relates to a vehicle responsive device comprising a block of resilient material. This block has two recesses connected by a slit which converts to a slot when the block of resilient material is compressed. A magnetic responsive contact means is on one side of the slit, while a permanent magnet is on the other side of the slit. When the slit is closed, the contact means is operated by magnetic flux from the permanent magnet; but, when the slit opens and changes into a slot the permanent magnet is operated to a position for releasing the contact means by decreasing the magnetic flux through the contact means.

The present invention comprises a device responsive to the presence and passage of wheels. A rectangular shaped body of resilient material has two adjacent holes running transverse of said body which are connected by a slit. When the body is depressed, the slit changes to form an open slot. Two smaller holes are located, one on one side of the slit and the other on the opposite side of the slit. One of the smaller holes has a reed contact and the other has a permanent magnet. When the body is not depressed and the slit is closed, the reed contact is operated by the magnetic flux from the permanent magnet; but, when the body is depressed and the slit opens to form a slot, the reed contact is released because of the reduction in magnetic flux passing through it. The reed contacts are movable in a particular direction which is at right angles to the direction of the depressing forces.

For a better understanding of the present invention, together with other and further objectives thereof, reference is had to the following description, taken in connection with the accompanying drawing, while its scope will be pointed out in the appended claims.

BRIEF DESCRIPTION OF THE DRAWINGS

FIG. 1 shows a front open view of the vehicle detector mounted on a rail;

FIG. 2 shows a cross sectional end view of the detector taken on lines 2—2 of FIG. 1;

FIG. 3 is an illustration of the operation of the detector of FIGS. 1 and 2 while the tread of a wheel is present directly over it;

FIG. 4 shows a circuit diagram controlled by the detector device for operating a electromagnetic relay which in turn can control other devices as desired;

FIGS. 5A and 5B show how a plurality of the devices as shown in FIGS. 1 and 2 can be mounted for highway vehicle detection;

FIG. 6 illustrates the travel of a point on the flange of a railway wheel which travel forms a looped trochoid (figure not proportional);

FIG. 7 is a unit having a block of resilient material but of slightly different shape particularly to be used with railroad wheels having flanges;

FIG. 8 is a cross sectional end view taken on line 7—7 of FIG. 7.

DESCRIPTION OF THE PREFERRED EMBODIMENTS

According to the present invention one form is particularly adapted for use on railway tracks and highways where the device is operated in response to the tread or peripheral part of the wheels to be detected.

On the other hand, another form of the invention is more particularly adapted to be used with railway wheels having flanges located outside the plane of the wheel tread for actuating the detector here described. This form of the invention is shaped differently so as to be more responsive to the trochoidal movement of the flanges to prevent relative movement between the detector and such operating portions of the wheel.

The first form is shown in FIG. 1, where a block of resilient rubber type material is mounted on a rectangular piece of metal 6 by suitable bonding. This unit is then fastened to the horizontal leg of the L-shaped bracket 7 which supports the block 5 adjacent the outside of rail 8, since the vertical leg of bracket 7 is attached to the web of rail 8.

It should be understood that the vertical positioning of the block 5 relative to the rail head is determined by the location of the attachment of the vertical leg of bracket 7 on the web of the rail. Since the detector block 5 is assumed to be attached on the outside of a tangent rail, it will have to be mounted sufficiently high in order for the wheel tread to depress the upper portion of block 5.

Again referring to FIG. 1, a hole or recess 9 is located transverse of the block 5 and is just above or adjacent the hole 10. These two holes 9 and 10 are then interconnected by a slit 16 in the intervening rubber. When the wheel tread of a vehicle depresses block 5 at C, the material is generally pushed downward and the holes 9 and 10 deform and become wider horizontally (see FIG. 3) so that the walls of the slit 16 spread apart to form a substantial slot 16 while the flanged wheel 30 has its tread located at C. In FIG. 3, the sides of the slot 16 are shown angularly spreading. This is because the hole or recess 10 is larger than the hole or recess 9. For convenience, the hole 9 is termed a minor hole while the hole 10 is termed a major hole because of the relative differences in their diameters.

Although these holes or recesses 9 and 10 are shown as being circular, they might be made of a different shape such as hexangular or the like. It should also be noted that the holes 9 and 10 may be made the same size, in which case the sides of the slit 16 would remain substantially vertical as they move away from each other in a horizontal direction when the upper position of the block 5 is depressed at C.

Two somewhat smaller holes 11 and 12, are located parallel to each other and on opposite sides of slit 16. An encapulated reed contact 22 is located within hole 12. This reed contact 22 is of a miniature type with its contacts operable back and forth in a given plane by the presence or absence of a sufficient magnetic flux. For example, when the slit 16 is normally closed, the rod type permanent magnet 21 located in hole 11 supplies sufficient magnetic flux to cause the reed contacts 22 to close; but, when the block 5 is depressed, and the slit 16 turns into a slot 16, the holes 11 and 12 are considerably separated and the magnetic flux passing through the reed is insufficient to maintain the contacts 22 closed so that they then assume their spring biased normal open position.

The reed contacts 22 are connected with suitable flexible wires through grooves 15 on opposite sides of the block 5 to the recess 14 which then provides for a connection to lead wires as shown in FIG. 4. These lead wires are connected in series with battery B and an electromagnetic relay R which can be used to control various electroresponsive devices. The dotted line 23 in FIG. 4 represents the normally closed slit 16 so that the reed contacts 22 are closed and relay R is normally energized.

It should of course be understood that the above structure is fully enclosed by the sealing of two strips 17 and 18 of resilient material to the opposite sides of the block 5 (see FIG. 2). These strips fully close the holes, recesses and grooves above described. However, the external wire connections to the leads within recess 14 require a passage through one of the strips such as 18. The small hole thus provided through strip 18 is finally sealed with rubber gum after the wires have passed through it.

As described above, the block 5 is bonded to the metal block 6 which in turn is atached to the rail 8 for ready changing of the unit. It is to be understood, however, that block 5 can be mounted to the rail in different ways. For example, bolts can be used to extend through holes in the block 5. These holes can be placed in the block 5 of FIG. 1 with suitable tuke-like inserts 25 bonded to block 5 as shown in FIG. 5B. These modified blocks 5 can then be mounted to the rail by suitable bolts similarly as shown in FIG. 8.

However, it is contemplated that this form of mounting is particularly adaptable to the use of a multiplicity of units all mounted on long rods 27 with washers and nuts on the ends as shown in FIG. 5A. These units can be spaced by intervening blank units, or they can be directly associated adjacent each other depending upon the width of the narrowest wheels to be detected relative to the width of the detector blocks 5. This form of mounting is particularly adapted for placing a plurality of these units in a roadway to detect the passage of automobile vehicles. The rods having these units attached thereto are mounted beneath the road surface with a slot cover 26 allowing only the upper portions of the resilient block 5 to protrude through such slot for contact by the vehicle wheels. Such upper portions of block 5 would be just slightly raised above the plane of the road level. The long and gradual slope of the blocks ends would tend to prevent distortion of the block upon the passage of wheels. The reed contacts of all units would be front contacts connected in series for normally energizing magnetic relay R as shown in FIG. 4; but the opening of one or more of such front contacts would cause the de-energization of the relay R.

When a railroad type wheel with a flange passes along a rail any particular point on the outer edge of the flange follows a peculiar path with regard to the rail head. For example, the outer edge with regard to any particular point moves downwardly, then backwardly and upwardly while the wheel is steadily moving forward. This is illustrated in FIG. 6 where the flanged wheel 30 has a radius 29 to the wheel tread and a radius line 31 at the wheel flange. The outer end of this radius line 31 moves downwardly along 32, crosses the center line 34 and then rises along 33.

Since the illustration of FIG. 6 is not proportional to a full size wheel, it should be understood that radius 29 is in the order of sixteen one-half inches long and the radius 31 is about one inch longer. With this size wheel, the path shown by 32, 33, and 34 is approximate only, but it does show that the backward motion of the flange is while its lowest points are passing. The exact shape of the looped path can be calculated as described in "Mark's Mechanical Engineering Handbook" by Theodore Baumeister, editor for sixth edition published by the McGraw-Hill Book Company, Sec. 2–60 with FIG. 2.

This movement of the outer point on the radius of a circle as it runs along a fixed straight line is shown as a looped trochoid which is one form of a cycloid. Such trochoidal movement of the points on the flange of a railway wheel would thus tend to divert or distort the detector block 5 of FIG. 1 in so far as the shape of the detector block 5 would permit while such detector 5 is under its greatest depression. The upper portion of block 5 would thus tend to slip under this backward movement of the flange. Any such slipping would, of course, be wearing on the block 5 since it is of softer material than the metal flange of the wheel.

This operation with regard to a wheel flange is mentioned, because when the block 5 is mounted to be depressed by the wheel treads as in FIGS. 1 through 5, the compression of the block 5 is almost a strictly vertical movement with the sides of the slit 16 opening in a horizontal movement.

In view of the above, a second form of the invention is provided as shown in FIGS. 7 and 8 which is particularly adapted for use with wheel flanges. In this form of the invention, the center portion of the block 50 of FIG. 7 rises more abruptly than the block 5 of FIG. 1, and the base of the block 50 is shorter. In general, the block 50 could be said to be more stubby than block 5 of FIG. 1. In other words, the base of the block 50 is substantially square and acts as a support for the central portion of block 50 rising abruptly in the center end of it. This means that the upper portion of block 50 has less resistance to a horizontal movement. For this reason, the trochoidal movement of the flange can distort block 50 without creating frictional conditions between the surface of the flange and the block 50 of resilient material.

The block 50 of suitable resilient material has two holes in which metal tubes 51 are bonded. These tubes are mounted on bolts 52 supported by the web of the rail as seen in FIG. 8. However, a suitable bushing 53 is mounted on the bolts 52 before the block 50 is placed in position and the outer nuts tightened, such bushing 53 acts as a firm base for the tubes 51 and the mounting nuts when they are tightened. Since the block 50 is bonded to the tubes 51 and they in turn are firmly held, the block 50 is firmly supported in its upright position as shown in FIGS. 7 and 8.

It is to be understood that the holes or recesses in the block 50 for causing operation of the slit and the holes which receive the reed contacts and permanent magnet are arranged in a similar fashion as described above in connection with FIGS. 1, 2, 3, 4, and 5. The reed contact also operates in the same manner as described above and controls exterior circuitry as described in connection with FIG. 4.

It should be understood that this invention is not limited to operation by railroad type wheels, but it can be mounted for operation by vehicle wheels traveling along a roadway as above explained. Also, this device is particularly adapted for outside use since its whole structure is sealed and is normally waterproof. Also, the reed contacts used in the structure are hermetically encapsulated.

It is noted that the enlargement in the size of the operational holes or recesses would cause the apparatus to be more sensitive. The greater the distance of the horizontal movement of the sides of the slit between the operational holes in accordance with a given amount of vertical distance of compression, the greater the sensitivity.

It should be understood that operational blocks of different shapes may be employed, and the shapes of the operational holes or recesses can be varied as desired.

Although a reed type contact encapsulated in its own structure is assumed to be used, it should be understood that more simple contacts may be used if desired. For example, a contact could be mounted on each side of the slit as to provided two contacts normally contacting with each other but separated when the block is depressed and the slit changes to a slot. With such a modification, major and minor holes might well be desirable for use in connection with the wheels having flanges, because the distortion of the block would then cause a rubbing or sliding motion between the two contacts which would serve to maintain high contact efficiency.

The reed contacts proposed to be used herein are capable of moving in a horizontal direction when acted upon by a suitable amount of magnetic flux and are released when such flux is reduced below an operative amount. Because such direction of operation of the contacts is horizontal i.e. at right angles to the vertical direction of compression, such vertical direction of compression is ineffective upon the contacts in so far as actual movement is concerned. In other words, the contacts are unresponsive to direct physical movement whether rapid or slow, since they only operate dependent upon the amount of flux passing through their metallic structure.

Also, since the number of operations of the detector may be considerable and in rapid succession, it may be desired to have the resilient material include suitable damping material so that the device does not become self-oscillatory at any particular speed of the passing wheels. For example, the material could be a highly damped or low rebound elastomer such as butyl rubber so that it would not oscillate after having been acted upon by a passing wheel.

From the above it should also be readily apparent that the presence of a wheel standing on the device and acting to compress it will cause the actuation of the contacts the same as moving wheels.

In the above description, the reed contacts are described as operated by magnetic flux from the permanent magnet when the slit is closed and as released when such slit is open to move the permanent magnet away from the contacts and reduce the flux below the operating value. Such reed contacts are shown and described as having front contacts closed when the operating flux is effective. Such front contacts are shown in FIG. 4.

However, it should be understood that these reed contacts can have normally closed back contacts which are opened when the magnetic flux rises to an operating value and which are closed when the flux reduces a certain amount below such operating value. In addition, reed contacts can be provided which have both front and back contacts. In the presence of an operating value of flux, the back contacts are open and the front contacts are closed; but when the value of flux is reduced to a releasing value, the front contacts open and the back contacts close.

Therefore, in view of these different combinations of contacts it shousd be understood that in the above description the presence of an operative flux means that the contacts are moved to operative positions whether or not the contacts are closed in such positions. Also, then the flux releases such contacts, they move to their spring biased released positions regardless of whether or not contacts are opened or closed thereby.

While there has been described what is to be considered as the preferred embodiments of the invention, it will be obvious to those skilled in the art that various changes and modifications may be made therein, without detracting from the invention, and it is therefore aimed in the appended claims to cover all such changes and modifications as fall within the direct spirit and scope of the invention.

What I claim is:

1. A detector responsive to a force exerted thereon by a passing wheel for producing a signal indicative of the presence of a vehicle comprising:

(a) a body of resilient material having a set of two parallel cylindrical holes disposed one above the other traverse of the direction of the wheel movement and having a normally closely spaced slit connecting said holes in a plane containing the axes of said holes and substantially aligned with the direction of the force, said body assuming a deformed shape when subjected to the force and expanding the spacing of the slit in a direction substantially normal to the force;

(b) a reed switch disposed in the body adjacent to the one side of the slit; and (c) a magnet located in the body disposed adjacent to the other side of the slit, whereby the reed switch is responsive to the magnetic flux of the magnet and said switch produces the signal when the force applied to the body widens the slit and removes said switch from the influence of the magnetic flux.

2. The detector of claim 1 wherein the lower hole is relatively larger in diameter than the upper hole for permitting the lower end of the slit to expand relatively wider than the top under the influence of the force.

3. The detector of claim 1 wherein the said magnet is a permanent type magnet.

References Cited

UNITED STATES PATENTS

| | | | |
|---|---|---|---|
| 1,558,242 | 10/1925 | Dalman | 200—85 |
| 2,494,819 | 1/1950 | Lane | 200—61.21 |
| 3,300,602 | 1/1967 | Raskin | 200—61.41 |
| 3,383,487 | 5/1968 | Wiener | 335—205 |
| 3,421,124 | 1/1967 | Kidd | 200—61.41 |

ROBERT K. SCHAEFER, Primary Examiner

M. GINSBURG, Assistant Examiner

U.S. Cl. X.R.

335—205